(12) United States Patent
Chrysafis et al.

(10) Patent No.: US 6,701,020 B2
(45) Date of Patent: Mar. 2, 2004

(54) JADE-JPEG BASED ADAPTIVE DOCUMENT COMPRESSION ENGINE

(75) Inventors: Christos Chrysafis, Mountain View, CA (US); Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 413 days.

(21) Appl. No.: 09/808,348

(22) Filed: Mar. 15, 2001

(65) Prior Publication Data

US 2002/0176632 A1 Nov. 28, 2002

(51) Int. Cl.[7] ............................................. G06K 9/46
(52) U.S. Cl. ................................. 382/239; 358/1.15
(58) Field of Search ................................. 382/239, 238, 382/236; 358/426.12, 426.16, 1.9, 1.15

(56) References Cited

U.S. PATENT DOCUMENTS

| | | | |
|---|---|---|---|
| 5,335,290 A | | 8/1994 | Cullen |
| 5,479,587 A | * | 12/1995 | Campbell et al. .......... 358/1.17 |
| 5,539,468 A | * | 7/1996 | Suzuki et al. ............ 375/240.2 |
| 5,875,041 A | * | 2/1999 | Nakatani et al. ............ 358/462 |
| 5,883,979 A | * | 3/1999 | Beretta et al. .............. 382/251 |
| 5,903,360 A | * | 5/1999 | Honma et al. .............. 358/450 |
| 5,999,710 A | * | 12/1999 | Smith et al. ............... 358/1.15 |
| 6,011,905 A | * | 1/2000 | Huttenlocher et al. ....... 358/1.2 |
| 6,219,454 B1 | * | 4/2001 | Kawano et al. ............. 382/232 |
| 6,256,415 B1 | | 7/2001 | Ratnakar |
| 6,314,208 B1 | * | 11/2001 | Konstantinides et al. ... 382/239 |

(List continued on next page.)

FOREIGN PATENT DOCUMENTS

| | | |
|---|---|---|
| EP | 0286286 A1 | 10/1988 |
| EP | 0974933 A2 | 1/2000 |
| EP | 1001613 A1 | 5/2000 |

OTHER PUBLICATIONS

International Telecommunication Union; Terminal Equipment and Protocols for Telematic Services; Information Technology—Digital Compression and Coding of Continuous-Tone Still Images—Requirements and Guidelines; Sep. 1992; 196 pages.

(List continued on next page.)

*Primary Examiner*—Samir Ahmed
*Assistant Examiner*—Martin Miller

(57) ABSTRACT

A method, system and program product for compressing a compound image, comprising forming compound image data into a plurality of blocks; obtaining classifying data that designate one from a plurality of classes for each of a plurality of said blocks, based on predominate compression properties of the block; for each of a plurality of said blocks, obtaining transformed data therefor from either a lossy or a lossless transform selected based on the classifying data for the block; and forwarding that transformed data to one entropy encoder. In one embodiment, obtaining transformed data comprises obtaining transformed data from at least one of a lossy transform, a first lossless transform, or a second lossless transform, based on the classifying data for the transform.

15 Claims, 5 Drawing Sheets

U.S. PATENT DOCUMENTS

| | | | | |
|---|---|---|---|---|
| 6,324,305 B1 | * | 11/2001 | Holladay et al. | 382/239 |
| 6,529,633 B1 | * | 3/2003 | Easwar et al. | 382/239 |
| 6,535,633 B1 | * | 3/2003 | Schweid et al. | 382/165 |
| 6,567,559 B1 | * | 5/2003 | Easwar | 382/239 |

OTHER PUBLICATIONS

International Telecommunication Union, "Information Technology—Digital Compression and Coding of Continuous–Tone Still Images: Extensions", Jul. 1996, 84 pages, ITU.

C. Chrysafis et al.; "Some Results on DCT–based JPEG Ecperiments"; Hewlett–Packard Company; Mar. 12, 1998; pp. 1–9.

Said et al.; Simplified Segmentation for compound Image Compression; Hewlett–Packard Laboratories; Oct. 1999; IEEE International Conference on Image Processing, Kobe, Japan; 5 pages.

Pamela Cosman, et al.; "Memory Efficient Quadtree Wavelet Coding for Compound Images"; Signals, Systems, and Computers, 1999; Conference Record of the Thirty–Third Asilomar Conference on Oct. 24–27, 1999, Piscataway, NJ, USA; IEEE, US; pp. 1173–1177.

* cited by examiner

JADE-JPEG BASED ADAPTIVE DOCUMENT COMPRESSION ENGINE

FIELD OF THE INVENTION

The present invention relates generally to the field of compression of compound images, and in particular, to a method, structure and program product that compresses the compound image using multiple transforms, but feeding the transformed data to only one entropy encoder.

BACKGROUND OF THE INVENTION

Image compression is widely used in hardcopy devices (printers, scanners), to reduce both the required memory and the internal transmission bandwidth. Typical pages handled by those devices are compound pages, i.e., pages that contain photographic (contone) images, graphics, and text. It is an established fact that the best compression performance for compound documents is obtained when different compression methods are applied to different image types. See A. Said and A. Drukarev, "Simplified segmentation for compound image compression" 1999 IEEE International Conference on Image Processing, Kobe, Japan, October 1999. For example, the best way to handle photographic images is to use some form of lossy compression, such as JPEG. On the other hand, lossless compression is most suitable for text and graphics, where it produces both the best image quality and the best compression compared to a lossy method.

The need to use various compression methods for a compound page leads to a solution based on using multiple codecs in a device. For example, one can use a JPEG codec (works only with 8×8 block) and a JPEG-LS codec (works only with individual lines) in a device pipeline, and use intelligent segmentation to decide which pages, or which parts of a page, should be handled by which codec. This approach will result in a good compression performance, but will increase complexity of a system, since we will have to support multiple codecs. Moreover, because of the significant differences in the underlying compression algorithms between JPEG and JPEG LS (or other lossless compression methods), it is very difficult to combine them both in the same digitized page, especially in the case of hardware based implementations. One important reason for the difficulty of such a combination is that because the codecs work with different segments (8×8 blocks versus individual lines), following processing for the transforms is incompatible. The most appropriate solution in this case would be to apply either a lossy method or a lossless method to the entire page, or to a page stripe, depending on the page type. However, since the same compression has to be used for groups of page lines, this does not solve the problem when text and photos are side-by-side.

The operation and compression performance of the JPEG standard is as follows. The typical image path for JPEG compression includes the following steps. The image is read and a color transform is performed. For example, an input image in the RGB color space is converted to the YCbCr space. After the color transform, each color component is compressed independently. In many cases, two of the three-color components (the chrominance components, Cb and Cr) are down-sampled by a factor of two or four. Four distinct operations in JPEG compression performed for each color component are as follows:

1. DCT (discrete cosine transformation).
2. Quantization.
3. Entropy coding, including zigzag scanning and Huffman, or arithmetic, coding of the quantized coefficients.
4. Bit stream management, where we write the codewords from the entropy coder into the output bit stream following the syntax rules of the JPEG standard.

JPEG compression performs very well in photographic images. It achieves visually lossless compression at relatively high compression ratios.

Quantization tables, as well as Huffman tables can be designed to achieve optimal performance for different types of photographic images and different compression ratios.

For non-photographic images, such as graphics or text, JPEG standard does not produce very good results. DCT artifacts (distortion, blurring, and other effects not in the original image) are visible even at relatively low compression ratios. The following simple example illustrates the inefficiency of JPEG for compressing text. Consider a bi-level image with the white level mapped to 255 and the black level to zero. A simple mapping from a 24 bits per pixel format for an RGB picture to a bi-level format will offer a compression of 24:1 with no loss in picture quality. It will be a significant challenge for JPEG to achieve visually lossless performance on text at compression ratios of 24:1. The reason for that is the DCT. DCT coding does not perform well in a block with a lot of high frequency content or with only few levels of intensity in the input values.

SUMMARY OF THE INVENTION

The present invention comprises, in one embodiment, a method for compressing a compound image, comprising the steps of: forming compound image data into a plurality of blocks; obtaining classifying data that designate one from a plurality of classes for each of a plurality of the blocks, based on predominate compression properties of the block; for each of a plurality of the blocks, obtaining transformed data therefor from either a lossy or a lossless transform selected based on the classifying data for the block; and forwarding that transformed data to one entropy encoder.

In a further aspect of the present invention, the forming page data step comprises forming blocks which are compatible with a JPEG standard.

In a further aspect of the present invention, the obtaining classifying data comprises obtaining classifying data based on information in page description language associated with that block.

In a further aspect of the present invention, the lossy transform is a DCT.

In a further aspect of the present invention, the obtaining classifying data step comprises classifying the blocks based on the parameters of the number of adjacent pixels, C, in a scan line order whose values are different by an absolute difference greater than a predetermined number, the difference D between the minimum and maximum values of pixels in the block being classified, and at least one threshold value T1.

In a further aspect of the present invention, there are at least two threshold values, T1 and T2, and if C is greater than T1, then data from the DCT is used as the transformed data, if C is less than or equal to T1 and D is less than or equal to T2, then data from the DCT is used as the transformed data, and if C is less than or equal to T1 and D is greater than T2, then the data from the lossless transform is used as the transformed data.

In a further aspect of the present invention, the obtaining transformed data step comprises sending the block data through only the lossless transform or the lossy transform based on the classifying data.

In a further aspect of the present invention, the obtaining transformed data step comprises sending the block data through both the lossless transform and the lossy transform and then selecting the data from one of these transforms as the transformed data based on the classifying data.

In a further aspect of the present invention, an extra symbol is added to an entropy table for the entropy encoder for signaling a change among lossy transform and the lossless transform.

In a further aspect of the present invention, the forwarding to an entropy encoder step comprises coding a difference between a previous block and a current block as follows: for a previous block being a DCT block and a current block being a DCT, the difference between the DC value for the current block and the DC value for the previous block is coded ; for a previous block being an LT block and the current block being a DCT, the difference between the DC value of the current DCT block and the y(0) value of the previous LT block that is coded; for a previous block that is a DCT block and the current block being an LT, the difference between the y(0) value and the DC value of the previous block is coded; and for a previous block that is an LT block and a current block that is LT, the difference between the y(0) value for the current block and the y(0) for the previous block is coded.

In a further aspect of the present invention, a first block in an image is a DCT block.

In a further aspect of the present invention, the obtaining transformed data step comprises obtaining transformed data from at least one of a lossy transform, a first lossless transform, or a second lossless transform, based on the classifying data for the transform.

In a further aspect of the present invention, the obtaining classifying data step comprises classifying the blocks based on the parameters of the number of adjacent pixels, C, in a scan line order whose values are different by an absolute difference that is greater than a predetermined threshold, the difference D between the minimum and maximum values of pixels in the block being classified, the number N of colors in a block, and at least two threshold values T1 and T2.

In a further aspect of the present invention, in the obtaining classifying data step, if N is less than or equal to two, then use data from the second lossless transform as the transformed data, else if D is greater than T2 and C is less than or equal to T1, then use data from the first lossless transform as the transformed data, else use the data from the DCT as the transformed data.

In a further aspect of the present invention, for the second lossless transform, the intensity values of the pixels for the blocks are assigned only two levels, V0 and V1, which are then mapped with pixels with intensity value V0 mapped to zero and pixels with value V1 mapped to 1, and then applying a bit-wise XOR operation to the pixels, and performing "bit packing" to represent each resultant quantity y(i) with just one bit.

In a further aspect of the present invention, two extra symbols are added to an entropy table for the entropy encoder to signal a change among the lossy transform, the first lossless transform and the second lossless transform blocks.

In a further aspect, the present invention comprises the entropy encoder selecting for use in encoding, one from a plurality of different Huffman tables, based on whether the block is a lossy block or a lossless block.

In a further embodiment of the present invention, a system is provided for compressing a compound image, comprising: a block former for forming compound image data into a plurality of blocks; a first component for obtaining classifying data that designate one from a plurality of classes for each of a plurality of the blocks, based on predominate compression properties of the block; a second component, for each of a plurality of the blocks, obtaining transformed data therefor from either a lossy or a lossless transform selected based on the classifying data for the block; and a single entropy encoder for receiving the transformed data.

In a further embodiment of the present invention, a program product is provided including computer readable program code for compressing a compound image, comprising: first code for forming compound image data into a plurality of blocks; second code for obtaining classifying data that designate one from a plurality of classes for each of a plurality of the blocks, based on predominate compression properties of the block; third code, for each of a plurality of the blocks, obtaining transformed data therefor from either a lossy or a lossless transform selected based on the classifying data for the block; and fourth code for receiving and entropy encoding the transformed data.

DETAILED DESCRIPTION OF THE PREFERRED EMBODIMENTS

Two embodiments of the present invention will be described, but these embodiments are illustrative only, and the present invention is not limited thereto. The first embodiment, JADE-I, is the lowest complexity version. The second embodiment, JADE-II, has a slightly higher complexity, but achieves a higher compression ratio, especially for text and simple graphics images.

JADE-I

As noted above, the best compression performance in a compound image is achieved if different compression methods are used for different parts of the image. In accordance with the present invention, a compound image is split into a plurality of image classes, where each class is defined as image data with similar properties with respect to compression. Then a different compression algorithm, or different parameter settings for the same algorithm, can be used for each class, but using a format that is compatible, so that follow-on processing can be substantially the same for both algorithms.

In order to keep the implementation simple for an illustrative embodiment, a system where image parts are classified in two classes is provided. Those classes correspond roughly to photographic image type and text/graphics image type. It is preferred that the present design be compatible with the JPEG or other predetermined format. To be consistent with the JPEG format for example, classification is performed, by way of illustration, on 8×8 image blocks for each color component. The present invention is not limited to blocks of this size or configuration.

By way of example but not by way of limitation, for lossy compression, the JPEG standard may conveniently be used with no modification at all or minimal modification. For lossless compression, the present invention uses parts of the JPEG system as much as possible. However, direct Huffman coding of input pixels is not a very efficient form of lossless compression. Accordingly, lossless compression is achieved in one embodiment of the present invention by using a specially designed Lossless Transform in the lossless compression path. The particular selected transform in this embodiment serves to decorrelate image samples, thus improving significantly the lossless compression performance of the system. The block-diagram of this embodiment, JADE-I, is shown in FIGS. 1A and 1B.

Figure 1A:
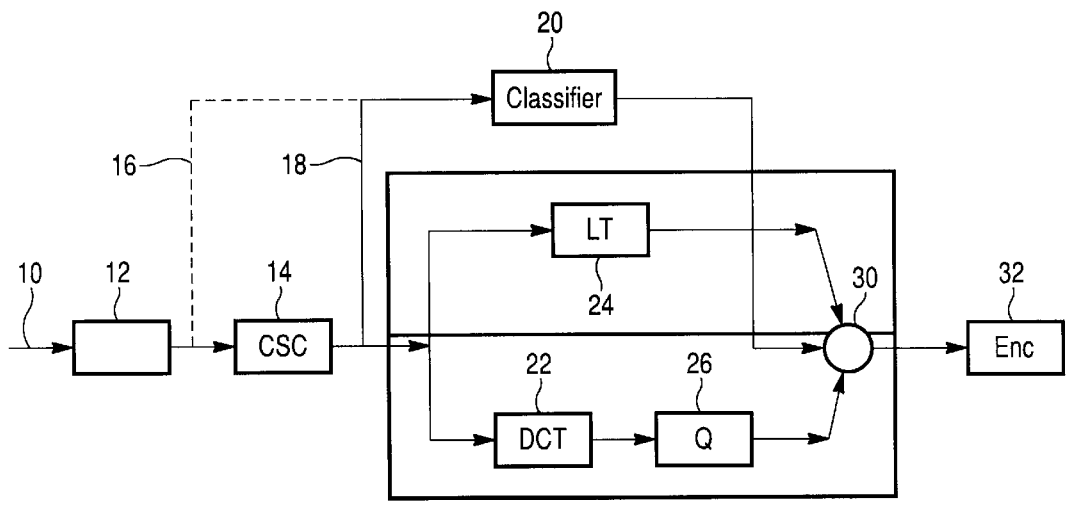
FIG. 1 is a schematic block diagram illustrating a first embodiment of the present invention.
Figure 1B:
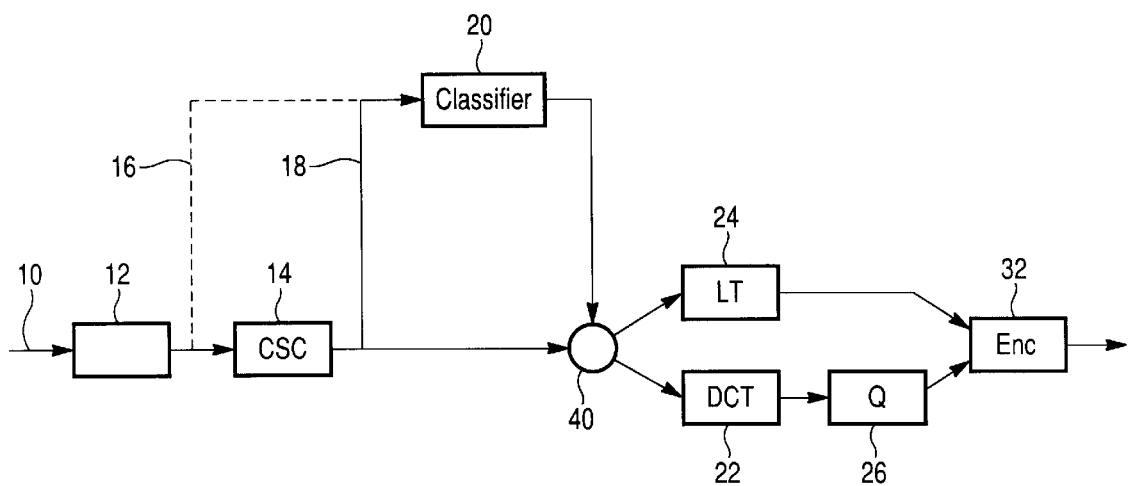

Referring to FIG. 1A, there is shown a configuration for implementing a first embodiment of the present invention. Compound image data is inputted on line 10. The data will typically include data for pictures, text, and graphics. It is preferred that the data be for a predetermined portion of a printing job, which will be referred to as a "page", used in its generic sense. The page data on line 10 is provided to a block former 12, which segments the page data into convenient blocks for use by a plurality of transforms. In the present invention, the term "blocks" is defined broadly to encompass page data segmentation wherein the data in each segment is contiguous.

The blocks are then provided to a color space converter (CSC) 14 to convert the block to a preferred color space. By way of example but not by way of limitation, the converter 14 may convert the block to the YCbCr space, using a standard conversion algorithm known in the art. Either before this conversion, as represented by line 16, or after this conversion, as represented by line 18, the signal is provided to a classifier 20. The classifier 20 operates to classify the data for each block, based on the predominant compression properties of the block, into one from a plurality of classes. Examples of classification algorithms that may be used will be discussed below. In many systems, color space conversion (CSC) takes place on buffered image blocks, so, it may be convenient (but not necessary) to perform the operations needed for image classification in the classifier 20 in parallel with color space conversion in the CSC 14. Using the line 16 input to the classifier 20 will facilitate this parallel to CSC classification operation.

The output from the CSC 14 is applied to at least two different transforms, with at least one of the transforms being a lossy transform, referred to in the example of FIG. 1 as the DCT block 22, and at least one of the transforms being a lossless transform, referred to in the example of FIG. 1 as LT 24. In the preferred embodiment, the lossy transform in block 22 is simply implemented by the discrete cosine transformation used in the JPEG standard. However, any other lossy transform that meets the compatibility requirements of the present invention may be utilized. The transformed data from the DCT 22 is then applied to a quantizer 26. The quantizer 26 may be implemented by a variety of different quantization methods that accomplish the function of converting the number of possible transform values to a smaller number (See reference: N. S. Jayant and P. Noll, *Digital Coding of Waveforms* (Ch. 4), Prentice-Hall, Englewood Cliffs, N.J., 1984.) By way of example but not by way of limitation, the quantizer 26 may be implemented by the standard JPEG quantizer to obtain a quantized DCT coefficient, normalized by the quantized step size. See the equation on top of page 28 of JPEG standard (T.81). The lossless transform LT 24 will be discussed below.

The outputs from the LT 24 and the DCT transform via the quantizer 26 are then applied to a decision block 30, which operates to select one of these outputs as transformed data to be sent on for further processing of that block data. By way of example but not by way of limitation, the decision block 30 could be implemented by a switch which is controlled by a signal from the classifier 20. If the classification signal from the classifier 20 indicates that the block comprises data for primarily a picture, then the output from the DCT transform will be selected. Alternatively, if the classification signal from the classifier 20 indicates that the block comprises data for primarily text, then the output from the LT 24 will be selected.

As can be seen from the description of FIG. 1A, the classification process in the classifier 20 uses image pixel data from the blocks before they enter the LT/DCT transform blocks. Thus, the image blocks can be sent to both transform channels in parallel, and the switch 30 operated based on the classification results from the classifier 20 just before the data is sent to follow on processing in an encoder ENC 32, that typically includes an entropy coder.

In an alternative embodiment preferably using software but also implementable using hardware, the classification process may be completed before the pixel data of the blocks enter the transform processing pipeline, so that a block will be sent to either the lossy, or the lossless channel, but not both. This implementation is shown in FIG. 1B. The same blocks are provided with identical numbering. The difference in the configuration is that a switch 40 is provided before entering the transform channels, and is used to select one of the transform channels for input of the block data based on the output signal from the classifier 20. Thus, the block data is not transformed by both transforms.

In a preferred embodiment, all operations described above with reference to FIGS. 1A and 1B refer to one color component. This embodiment, JADE-I, to provide compatibility with JPEG, treats all color planes independently. There is also no exploitation of cross color component dependencies in this example embodiment. This is preferred in order to keep the complexity of the system to a minimum.

Classification.

As noted above, the purpose of the classifier 20 is to identify photographic (continuous tone, or contone) image type blocks and text/graphics type blocks. Note that the goal is not to do an exact decomposition of a compound page into the photographic image, text and graphics portions. Rather, identification of blocks with, for example, text and graphics-like characteristics (few colors, long runs of the same color, sharp edges) is determined. These blocks classified as text and/or graphics are treated in the same way, i.e., they are passed through the lossless channel 24. All other blocks are assumed to be contone blocks, and are sent to the lossy channel 22.

One preferred method and logic for classifying data will now be described. For this method, let C denote the number of adjacent pixels, in the scan line order, whose values are different by an absolute difference that is greater than a predetermined value (such as zero or another value), i.e., the number of pixel changes in a block. Let D denote the difference between the maximum and the minimum values in each 8×8 block of pixels. Finally, let T1 and T2 denote some predetermined thresholds. Then the following rules, based on experiments with 8 bits per pixel color images, may be used for block classification.

Figure 2:
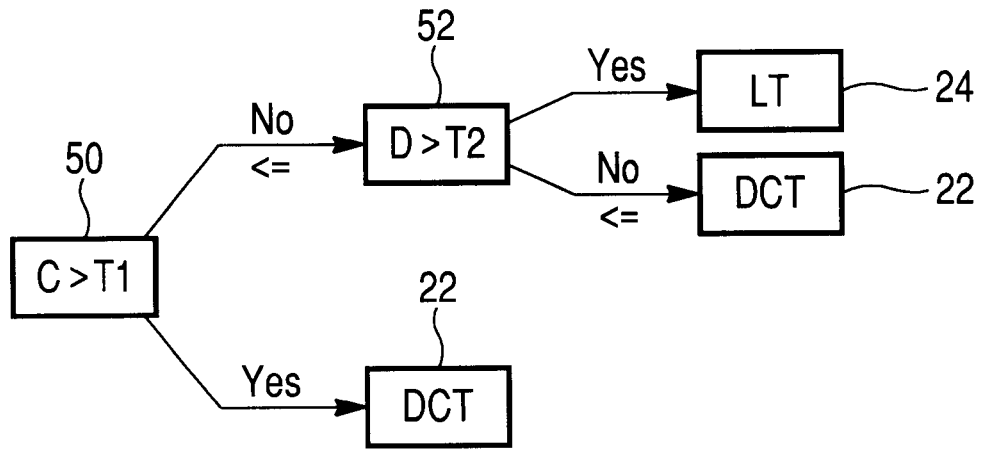
FIG. 2. Is a schematic block diagram showing the logic of one embodiment of the decision tree that may be used to implement the classification in the present invention.

A block diagram of one embodiment of the decision tree that can be used to implement a decision algorithm using these parameters is shown in FIG. 2. If C>T1 in logic 50 (i.e., the block has many pixels of different values), the block is classified as a contone block, and the block is passed through the DCT channel 22. If C<=T1 as illustrated by logic 52, the classification decision depends on the value of D. If D>T2 (large edges in the block), then the block is passed through to the lossless channel LT 24. If D<=T2, then the block is passed to the DCT 22 path. The thresholds T1, T2 can vary depending on the application. In experiments with the present design, values of T2=32 and T1=20 were used.

The embodiment shown in FIGS. 1A and 1B comprise very simple implementations of the classification strategy of the present invention. More sophisticated classification methods may be implemented, as desired and depending on processing and other requirements imposed on the designer.

In a further embodiment, a classifier need not be explicitly included in the configuration. For example, when compressing an image that comes from a page description language (PDL), information about the location of text and graphics may already be present in the language description for the page. In this case, a separate classification stage in the embodiment is not required. The PDL information designating a classification for a block may be saved and associated with the block and then used to operate the switch 30 or 40. By way of example but not by way of limitation, a bit, or for more than two classifications a byte, may be set with the classification information from the PDL language for one or more items of data within the block, and associated with that block. When the decision stage for that block is reached at the switch 30 or 40, then this associated classification information will be used to operate the switch. Accordingly, the classification data is obtained, rather than being actively determined.

Note that the classifier 20 has no impact on the decoder design. The encoder can implement any classification strategy, or can be upgraded to a more complex set of classification rules, and as long as the encoder uses the syntax for signaling block class change as defined later herein, a JADE decoder will be able to handle encoded bit stream.

Lossless Transform.

Figure 3:
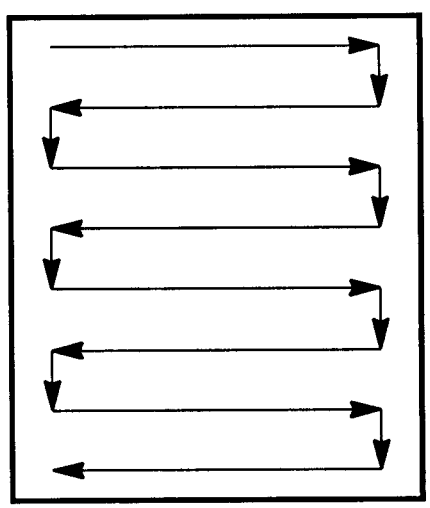
FIG. 3 is a graph illustrating a scanning path for a lossless transform.

The lossless transform 24 chosen for the JADE-I example embodiment is a modulo 256 difference operation. Starting with an 8×8-pixel block, this block is mapped into a sequence of length 64, as shown in FIG. 3. Denote the input pixel values as x[0], . . . x[63], and denote the output values as y(0), . . . y[63]. Then the transformation between the input and the output of LT is given by the following expression:

$$y(n)=|x(n)-x(n-1)+384|_{mod256}-128$$

$$x(n)=|x(n-1)+y(n)|_{mod256}$$

The modulo-difference operation tries to introduce as many output zeros as possible while allowing perfect reversibility of the lossless transform. The modulo difference operator was chosen for this example, instead of a regular difference because it does not expand the dynamic range of the output, i.e., the output values y(0), . . . y[63] are signed 8-bit integers. Note that since each intensity value is an 8-bit quantity, their difference would normally be represented as a 9 bit (signed) quantity. In order to see how that difference can be represented using only 8 bits, note first that for each given value of x[n] the difference can have only 256 different values, i.e., it can be represented as 1 byte. The set of transformations above takes advantage of this observation and allows for a perfect reconstruction of the input values.

The lossless transform shown above can be computed easily using the following "C" language expressions:

$$y(n)=(char)(x(n)-x(n-1))$$

$$x(n)=(char)(x(n-1)+y(n))$$

These expressions are valid for 2's complement arithmetic, which is used in Pentium based PCs and common UNIX workstations. Note that in hardware the LT 24 can be implemented in parallel with the DCT algorithm 22 in order to maintain the throughput of the JPEG engine.

Entropy Coding and Signaling of the Switch Between DCT and LT.

In order to describe the entropy coding process represented by element 32, a block that is directed through the lossy DCT 32 path is referred to as a DCT block, and a block that goes through the LT 24 path is referred to as an LT block. Entropy coding of the blocks that go through the DCT path is exactly the same as JPEG entropy coding. The only difference is in the way the DC component of a DCT block that immediately follows an LT block is treated. In JPEG the difference between the DC values of the current and the previous blocks is coded. In JADE, the difference that is coded is as follows: for a previous block being a DCT block and a current block being a DCT, the difference between the DC value for the current block and the DC value for the previous block is coded ; for a previous block being an LT block and the current block being a DCT, it is the difference between the DC value of the current DCT block and the y(0) value of the previous LT block that is coded; for a previous block that is a DCT block and the current block being an LT, the difference between the y(0) value and the DC value of the previous block is coded; and for a previous block that is an LT block and a current block that is LT, the difference between the y(0) value for the current block and the y(0) for the previous block is coded.

Entropy coding of the LT blocks is designed to preserve the JPEG entropy coding framework. Encoding of y(0) of the LT block is done as if it were a DC coefficient, i.e., the difference between the values of y(0) in the current and previous LT blocks is coded (Note that y(0) has similar properties to a DC coefficient, but the terminology "DC" is traditionally used only for DCT and similar transforms.). If the LT block, immediately follows a DCT block , then the difference between y(0) in the current block and the DC value in the preceding block is coded . All other values at the output of the Lossless Transform, y[1] . . . y[63] are coded as if they were AC coefficients. In principle, the best compression performance will be achieved if we use different Huffman tables for the DCT blocks and the LT blocks. However, switching tables on block boundaries may be difficult to do for high speed hardware implementations. In our implementation, we used the same Huffman tables for both DCT and LT blocks.

If it is desirable to provide two separate Huffman tables, one for the DCT blocks and one for the LT blocks, then such a configuration can be implemented by using a switch in the entropy encoder 32 to switch between the tables depending on whether the block was processed with the LT transform 24 or the DCT transform 22. The switch could be triggered, by way of example, by information from the LT block 24, the DCT block 22, and/or the classifier 20. For example, a bit could be set in the signal from the classifier 20 to the entropy encoder 32 if the block was classified as an LT block, but not set if the block was classified as a DCT block.

It should be noted that the creation of Huffman tables is well known in the art and can be formulated using a variety of different methods. By way of example but not by way of limitation, the Huffman tables could be formulated in accordance with Annex K in the JPEG standard CCITT T.81 (09/92) 'Information Technology-Digital Compression and Coding of Continuous-Tone Still Images-Requirements and Guidelines. Note that such Huffman tables can be generated based on a large set of images, or may be generated for every single image or block, i.e., a dynamic Huffman table.

The signaling of change between a DCT block and an LT block to the decoder is done by using one extra symbol in the DC entropy coding table. JPEG uses DC coding tables that may have up to 16 symbols (12 symbols for 8-bit image data, 16 symbols for 12 bit data, and 17 symbols for lossless compression. See W. B. Pennebaker and J. L. Mitchell, "JPEG still image data compression standard", Van Nostrand Reinhold, New York, 1993. In addition, the Extensions to the JPEG standard, "Information technology—digital compression and coding of continuous-tone still images: Extensions", ISO/IEC 10918-3, ITU-T Recommendation T.84 (1996E), 1996, p.32, introduced one extra symbol used for variable quantization. The numeric value of this extra symbol is X'15' (X stands for hexadecimal notation). The embodiment of the present invention using JADE adds one more symbol to the DC tables to specify a block type switch. This symbol is BL_SWITCH=X'16'. This symbol is inserted as the first symbol in the block before entropy coding, if the block type is different from the previous block. The rest of the elements in the block (DC/AC values, LT values) are exactly the same as in regular blocks. The rules for inserting the block switch symbol are illustrated in Table 1.

Table 1. Block switch symbols

TABLE 1

| Previous block | Block switch symbols | |
|---|---|---|
| | Current block | |
| | DCT | LT |
| DCT | None | BL_SWITCH |
| LT | BL_SWITCH | None |

In a preferred embodiment, all JPEG markers and bit stream features of JPEG are preserved in JADE without any modifications. JADE uses the convention that the first block in an image is a DCT block. This allows generation of a fully JPEG compatible stream in the case when the entire compound page represents a contone image.

JADE-II Embodiment

The lossless transform used in the embodiment of JADE-I was based on a very simple Lossless Transform and a classification strategy. A slightly more complex transform may be used in a further embodiment, with a more sophisticated classification strategy. This embodiment is still quite simple and result in a noticeable improvement over the performance of the JADE embodiment for a number of images.

Figure 4:
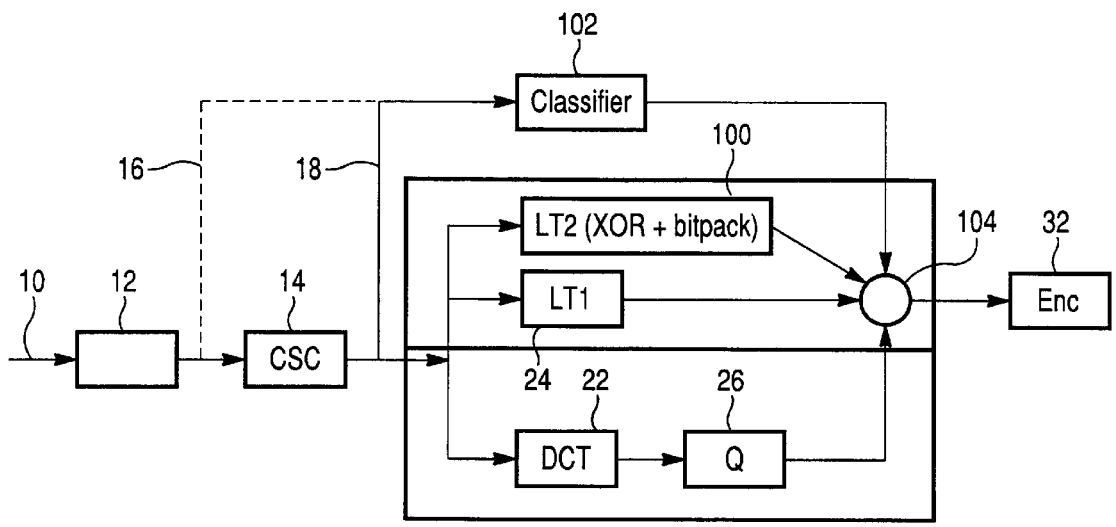
FIG. 4 is a schematic block diagram illustrating a second more complex embodiment of the present invention.

Many regions of the non-contone part of a compound page represent a single color text on a uniform color background. These regions will be sent by the JADE-I classifier 20 to the lossless channel. Although JADE-I will provide good compression of these regions, it will not be able to take advantage of the fact that the text regions contain only two colors, and hence can be compressed more efficiently. In order to handle this situation, one more lossless transform is added to JADE-I. The block-diagram of this modified system, called JADE-II, is shown in FIG. 4. The bottom part of FIG. 4 represents the lossy channel (the DCT 22 and the quantizer 26), which in one embodiment may be the same as used in FIG. 1. The top part represents the lossless channel, which includes two Lossless Transforms 24 and 100 and their corresponding lossless paths, LT1 and LT2. LT1 24 may be, by way of example, identical to the LT (modulo 256 difference) for JADE-I. LT2 will be discussed below.

Classification.

The Classifier 102 in one embodiment of JADE-II may be identical to that in JADE-I with the following addition. Let N be the number of colors in a block. Then the block will be passed through the Lossless Transform LT2 100 if and only if N<=2. Combining this condition with the classification condition for JADE-I, the following classification algorithms are obtained for JADE-II:

if N<=2 do LT2;
else if (D>T2 and C<=T1) do LT1;
else do DCT.

Lossless Transform LT2

Referring now to the operation of the LT2 100, an example is discussed using an 8×8 block of pixels from the original image. Assume that each pixel value is represented with 8 bits. If there are two levels of intensity, then the number of nonzero bits can be further reduced by applying the following mapping. Assuming that the intensity values in this situation for the two levels are V0 and V1, map all pixels with intensity value V0 to zero and all pixels with value V1 to 1. Then apply a bit-wise XOR (operation to the pixels, and do "bit packing", i.e., represent each resultant 8 bit quantity y[i] with just one bit, 0 or 1. The result is 64 bits (one bit per pixel), which along with the values of V0 and V1, provide a full representation of the pixels from the original block. Let those 64 bits be b[0, . . . , 63]. Consider the 10-entry vector:

G={V0,dV1,b(0:7),b(8:15), . . . , b(56:63)}

The quantity dV1 represents the difference between the V1 value in the current block and the V1 value in the last block processed with the same LT2 transform, mapped to an 8-bit value. Note that since each intensity value is an 8-bit quantity, their difference would normally be represented as a 9 bit (signed) quantity. In order to use only 8 bits for the difference, the same transformation that was used in JADE-I is used. Denote the values of V1 in the current and previous blocks, as V1n and V1n−1, respectively. Then the following formula will map the intensity difference into an 8-bit quantity in the range [−128, +127]:

$$dV1 = |V1_n - V1_{n-1} + 384|_{mod 256} - 128$$

$$V1_n = |V1_{n-1} + dV1|_{mod 256}$$

or in "C" notion:

$$dV1 = (char)(V1_n - V1_{n-1})$$

$$V1_n = (char)(V1_{n-1} + dV1)$$

Initialization of dV1 is performed by assuming that the value of V1 in the previous block was 0. For all subsequent blocks, the previous value is assumed to be the value in the last seen block that was classified as a block with two colors.

The advantage of using this particular lossless transform LT2 is clear from the equation for the vector G. Only 10 bytes are used to represent an array of 64 pixels, thus achieving 6.4:1 compression even before entropy coding.

There appears to be a difference in the way V0 and V1 are treated in the expression for G. The direct value is used for V0, but a difference for V1. This difference in treating these quantities is eliminated in the entropy coder, where the difference between the values of V0 in consecutive blocks is coded, rather then the values themselves. The encoder can use any approach in deciding which of the two intensity values in a block will be assigned the value V0 and which the value of V1. For example, the value of the first pixel in a block can be made V0, or the same intensity value can be used for V0 as was used in the previous block. Experiments did not show any significant impact of the assignment of the intensity values on the performance of JADE.

It should be noted that a switch 104 is shown in FIG. 4 positioned so that the blocks of data would be processed by all three transforms, and then the switch 104 would be used to select the data from one of the transforms as the transformed data to be send on to the entropy encoder 32. This selection would be made based on the classification of the block by the classifier 102. This scheme is very similar to that shown in FIG. 1A. Alternatively, the switch could be located in advance of the entry into the paths for the transforms, per FIG. 1B, so that the block of data would only be processed by one of the transforms. Note that as in FIG. 1, the input for the classifier 102 can be taken from either line 16 or line 18.

Entropy Coding and Signaling of the Switch Between the DCT and the LT Channels.

Using terms similar to the ones used for JADE-I, a block that is directed through the lossy DCT 22 will be referred to as a DCT block, a block that goes through the LT1 24 will be referred to as an LT1 block, and a block that goes through the LT2 100 will be referred to as an LT2 block. Entropy coding of the DCT blocks and the LT1 blocks may be performed as was described above for JADE-I.

Entropy coding of LT1 blocks is performed similar to that of LT1 blocks. The component V0 is treated as the DC component, and the subsequent components of the vector Q are treated as if they were 10 first quantized DCT coefficients. As noted above, the best compression performance will be achieved if different Huffman tables are used for the LT2 blocks. However, switching tables on block boundaries may be difficult to do for high speed hardware implementations. In the preferred embodiment, the same Huffman tables are used for DCT, LT1 and LT2 blocks.

The signaling of change among DCT, LT1 and LT2 blocks is performed similar to the way it is done in JADE-I. Since JADE-II has two additional channels compared to JPEG, two extra symbols should be added to the JPEG entropy table. These symbols are BL_SWITCH1=X'16' and BL_SWITCH2=X'17'. These symbols are inserted as the first symbols in the block before entropy coding, if the block type is different from the previous block. The rules for inserting the block switch symbol are shown in Table 2.

All JPEG markers and bit stream features of JPEG are preserved in JADE-II. In one implementation of JADE-II, the convention is used that the first block in an image is a DCT block. This allows generation of a fully JPEG compatible stream in the case when the entire compound page represents a contone image.

Table 2. Block switch symbols for JADE-II

TABLE 2

| | Block switch symbols for JADE-II | | |
|---|---|---|---|
| Previous | Current block | | |
| block | DCT | LT1 | LT2 |
| DCT | None | BL_SWITCH1 | BL_SWITCH2 |
| LT1 | BL_SWITCH1 | None | BL_SWITCH2 |
| LT2 | BL_SWITCH2 | BL_SWITCH1 | None |

3 Experimental Results.

A large set of test images was used for testing JADE. The set contained 90 images of various types including: contone images, halftoned images, graphics images, text (black and white and color), and, most of all, compound images with parts being contone, graphics and text. For ease of notation, the images were assigned indices from 1 to 90. Unless otherwise specified, the correspondence between image indices shown in the figures in this section and image types is as follows. Images 1,2,3 are graphics images with dither-like halftone patterns used to represent single color areas. Under magnification to the pixel level, one can see long runs of repeated pixel patterns in images 2 and 3. Images 4 to 15 are mostly contone images, and the rest is a mixture of contone, text and graphics parts. Typically, the image with a higher index would have a smaller contone part, and a larger text and/or a simple graphics part.

JADE was compared with a reference system that comprised two separate encoders: baseline JPEG and JPEG LS. It was assumed that the default mode of operation for the reference system is to use JPEG LS, since it provides the best image quality and good compression for a large class of images (mostly text, graphics or a combination of both). If the compression performance of JPEG LS is found to be unsatisfactory, i.e., the compression ratio was too low (which would be the case for pure contone images, or compound images with substantial contone parts), then the lossy JPEG would be applied to such an image. The reference system did not use segmentation of images for the practical reasons described in the Introduction.

In order to do a reasonable comparison, parameters of both JPEG and JADE have to be selected properly. The key parameters that need to be optimized in both cases are the quantization tables and the quality factor Q (note that the Q factor is used to scale the quantization table parameters). Since JPEG can be used on compound pages, which have both the photographic image parts and text/graphics parts, its quantization table optimization has to be done so that the high frequency components, i.e., graphics and text, do not degrade noticeably. In case of JADE, the lossy JPEG parts are applied only to the photographic image parts, so, its quantization tables need to be optimized to produce the best rendition of these parts. The text and graphics portions are taken care of mostly by the lossless channel. The Huffman tables can also be optimized for different types of images.

In the experiments shown below the same quantization tables and the same 0 factor (Q=75 using the Independent JPEG code convention) were used for both JPEG and JADE. This guaranteed that the quality of photographic portions in images were the same for both JADE and JPEG. Separate Huffman tables for JADE were developed using standard Huffman analysis, as described previously. Since the statistics of the output of the lossless channel for JADE is quiet different from the output of DCT, it does not make much sense to use JPEG Huffman tables which are optimized for the output of a lossy DCT. The tables were fixed for the entire set of test images.

Figure 5:
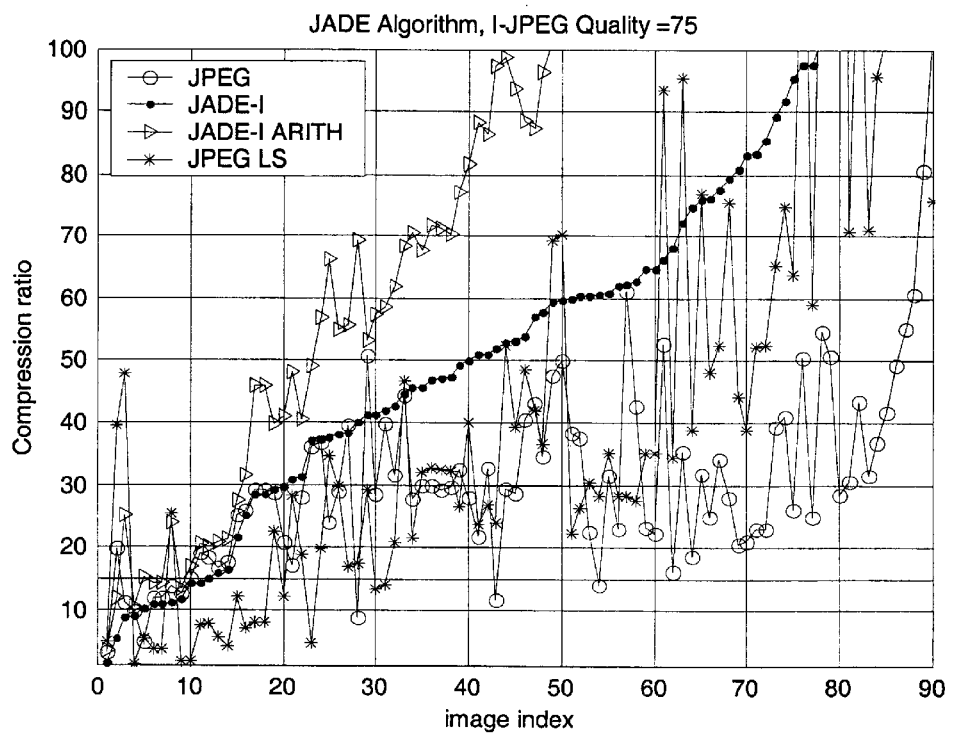
FIG. 5. is a graph of image versus compression ratio for JADE-I and JADE-II using arithmetic doing, JPEG and JPEG-LS.

FIG. 5 compares the overall performance of JADE-I, JADE-I with arithmetic coding, baseline JPEG and JPEG LS. As can be seen from this Figure, the performance of JADE-I is quite comparable with the performance of the combination of JPEG and JPEG LS. For the region of mostly contone images (lower compression ratio portion of the graph), the performance of JADE and JPEG is quite similar, as expected. As the graphical and/or textual portions of the compound images increase, JADE starts to outperform JPEG significantly, by a factor of as high as 5 or more. JADE also demonstrates better compression than JPEG LS for most images in this set. The most notable exception to this is images 2 and 3. As was mentioned above, these images exhibit repeated runs of the same pixel pattern, as well as some long white runs, which match very well the adaptive nature of JPEG LS and its ability to compress very well long runs.

Figure 6:
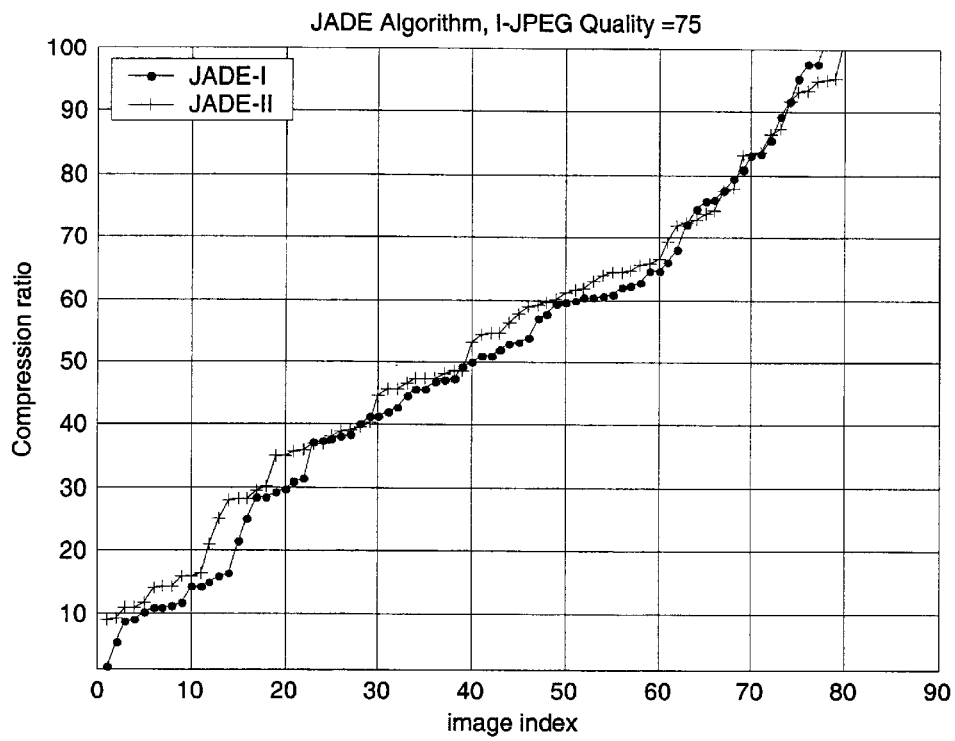
FIG. 6 is a graph of image index versus compression ratio for JADE-I and JADE-II.

In FIG. 6 we present the performance of both JADE-I and JADE-II with Huffman coding. On the average, the performance of both versions of JADE is similar. However, JADE-II performs noticeably better in the "difficult cases" (images 1–23). The main reason for the introduction of JADE-II was to improve the compression performance of JADE for such cases.

Figure 7:
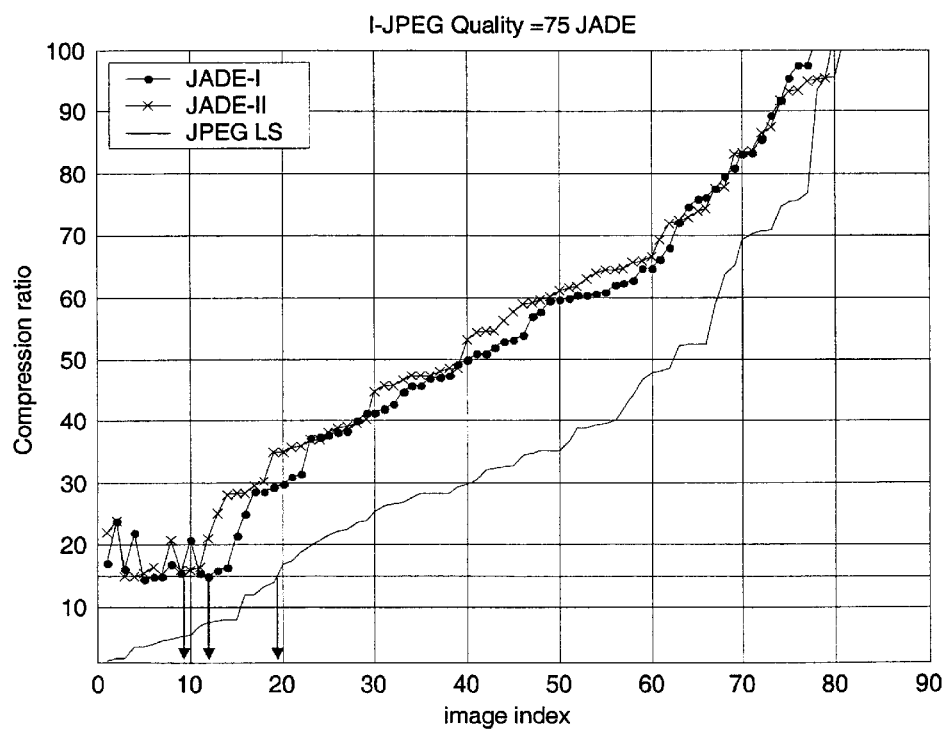
FIG. 7 is a graph of the compression ratio versus image index for a minimum compression of 15:1.

FIG. 7 illustrates an important property of the system under consideration, namely, how likely it is that the system will not be able to compress an image to the desired ratio in one pass, i.e., compress to less than the size of a compressed page. (A second pass using a different compression ration would be required if this is not accomplished.) In practical terms this means that the system buffer will overflow during the coding pass. Recall, that the reference system uses JPEG LS in the first coding pass, and our system uses JADE with predetermined parameter Q, for example, Q=75. (Note that the reference system would use JPEG with the same quality factor in the second pass). In our experiments the minimum compression ratio was set to 15. This ratio appears to be quite adequate in achieving visually lossless compression for all images in our set that had to be compressed with JPEG. Note that image indexing in this Figure is different from the one used in FIG. 5. Here, for each of the algorithms the images are arranged in the order of the increasing compression ratio. As can be seen from this Figure, JADE-I decreases significantly the likelihood of the second compression pass, by as much as 40% for our test set. JADE-II provides even more substantial savings, about 60% compared to JPEG LS.

Figure 8:
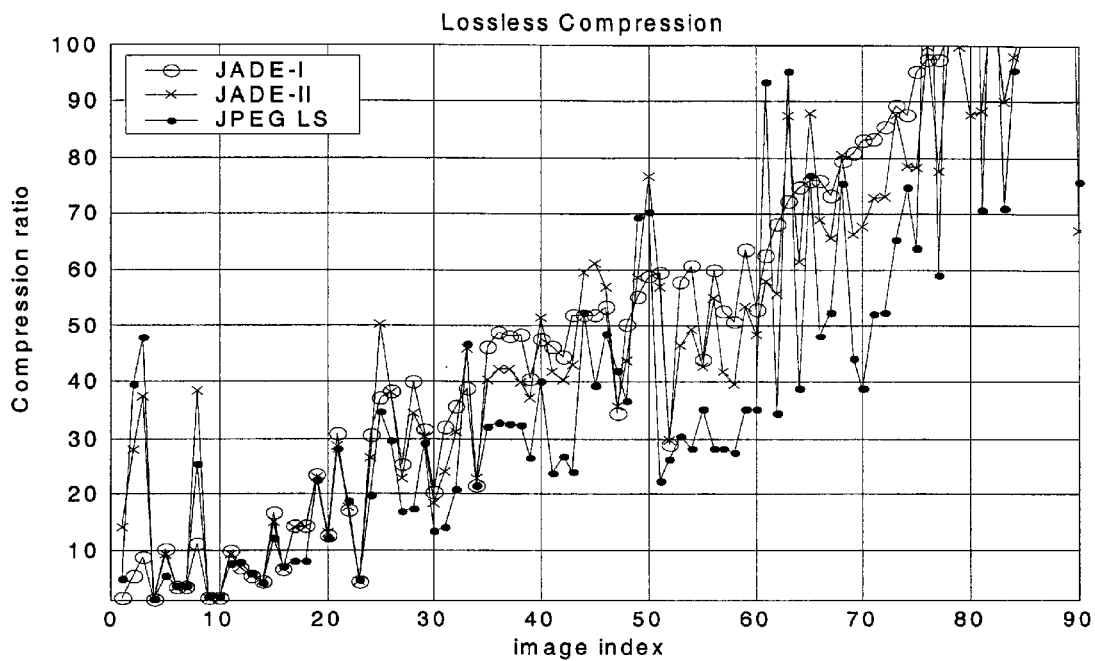
FIG. 8 is a graph of the compression ratio versus image index for lossless performance of JADE-I and JADE-II with Huffman coding.

FIG. 8 illustrates lossless performance of JADE with Huffman coding. For most of compound documents performance of JADE, on the average, is similar to that of JPEG LS. JPEG LS outperforms significantly JADE-I for simple graphics images 2 and 3. However, JADE-II narrows this gap significantly, and outperforms JPEG LS on a number of images (such as image 17).

Figure 9:
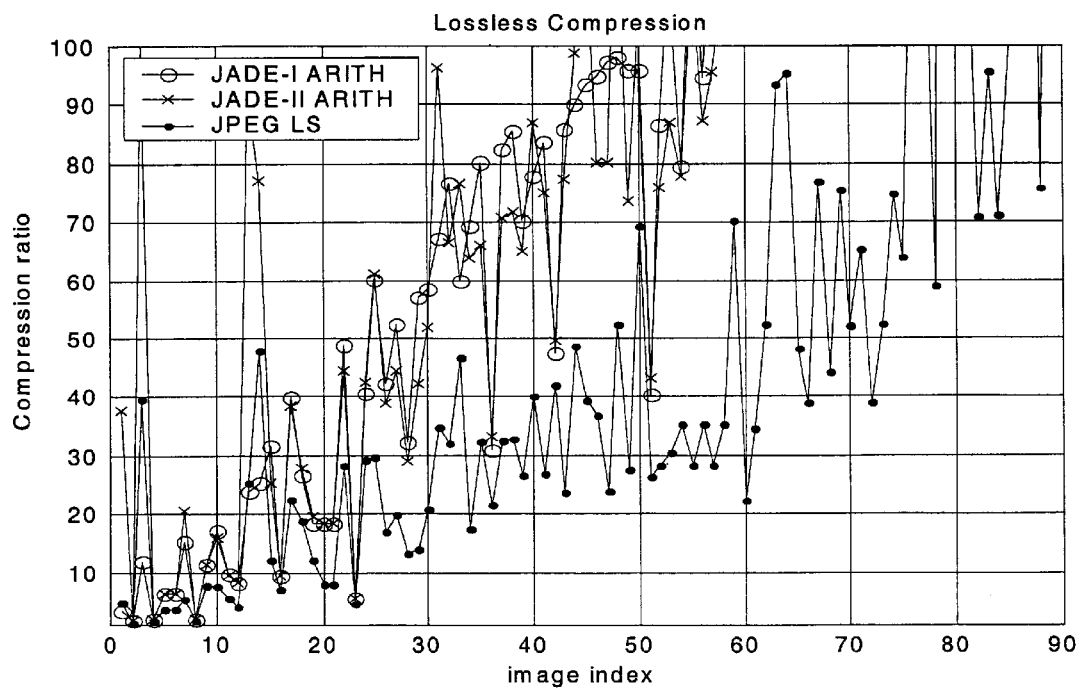
FIG. 9 is a graph of the compression ratio versus image index for the lossless performance of JADE-I and JADE-II with Arithmetic coding.

FIG. 9 compares lossless performance of JADE with arithmetic coding. As one can see, arithmetic coding leads to a very significant increase in compression compared to both JADE with Huffman coding and JPEG LS.

FIG. 9 compares lossless performance of JADE with arithmetic coding. As can be seen from the figure, arithmetic coding leads to a very significant increase in compression compared to both JADE with Huffman coding and JPEG LS.

Software complexity comparisons were also conducted by evaluating the execution time for various methods. Comparing execution times of various algorithms is always a challenging task. Many factors influence the outcome of this comparison, such as: image type (for example, graphics images tend to compress faster than photographic images), compression ratio (higher compression ratios also lead to shorter execution times), how good the software implementation is, the platform type (i.e., a Pentium-based PC versus some proprietary UNIX processor), encoder execution time vs. decoder execution time, etc. The timing results, tentative as they may be, provide valuable practical data for comparison of the various methods.

IJG (Independent JPEG Group) code was used for the implementation of the baseline JPEG algorithm. The JADE implementation was based on that code, with the addition of the LT blocks and the replacement of the Huffman coding part with the arithmetic coding for the arithmetic coding experiments. UBC (University of British Columbia, Canada) public domain software was used for JPEG LS data. In order to generate timing comparisons, the algorithms were run on different platforms (Pentium-based Windows NT, and HP-PA UNIX systems), for different quality settings for JPEG and JADE, and for the entire set of images.

Running time for JADE-I and JADE-II was very close to that of JPEG, typically within 20%. JADE with arithmetic coding was almost as fast as JADE with Huffman coding for most images, with the increase in execution time of no more than 20% for compound documents. This is an interesting result, in light of the common perception that arithmetic coding is always much slower than Huffman coding. As can be seen from this data, for typical compound documents using the arithmetic entropy coding, the compression ratio for JADE will increase by as much as 100% or more (see FIG. 5), with a relatively small increase in running time. The situation is different for photographic images. For photographic images JADE with arithmetic coding was almost 2 times slower than JADE with Huffman coding.

Comparing JADE with Huffman coding to JPEG-LS, it was observed that the results varied significantly, depending on the image type, the processor used, etc. In most cases, JADE ran faster than JPEG LS, sometimes up to 2 times faster in the encoder and up to 4 times faster in the decoder. Yet there were a couple of cases when JPEG LS execution time was about 1.7 times faster than that of JADE.

A new method for compression of compound images has been developed. This method, called JADE, is based, in a preferred embodiment, on the JPEG image compression system. In this preferred embodiment, it uses the standard JPEG approach for lossy compression, and utilizes the entropy-coding portion of JPEG for lossless compression. The compression performance of JADE is similar to that achieved with the state-of-the-art systems utilizing two different compression engines, such as JPEG and JPEG LS, i.e., using two different entropy encoders. In hardware implementations, the method of the present invention eliminates the need for having two separate compressors, thus reducing the hardware cost by about 50%. JADE also lends itself to a fast software implementation.

Accordingly, the present invention provides a low complexity alternative for compression of compound documents. The newly developed algorithm is called JADE (JPEG based Adaptive Document compression Engine). It is based on the JPEG architecture. It takes advantage of the Huffman coder in the JPEG pipeline to do lossless compression. By doing so, the increased complexity of some other solutions is avoided, such as replacing the Huffman coder by a "JPEG LS like" entropy coder in the JPEG system. See S Liu, "JPEG2000: A scalable hybrid lossy/lossless still image compression scheme," Submission to ISO/IEC JTC1/SC29/

WG1, 1997; and C. Chrysafis, A. Drukarev, S. Liu, and N. Memon, "Some results on DCT-based JPEG experiments" Document ISO/IEC JTC1/SC29/WG1N748, 1998. The complexity of JADE is basically the same as the complexity of JPEG, with very minor additions. At the same time, JADE's compression performance over a range of typical images is comparable to the performance of a system that combines lossy JPEG and the state-of-the art lossless compression methods, such as JPEG LS. The solution of the present invention is particularly suitable for hardware implementations, especially ones that have to use the JPEG algorithm in any case (for example, due to the need to be standard compliant, or to simplify image exchange, etc.).

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto, and their equivalents.

What is claimed is:

1. A method for compressing a compound image, comprising the steps of:

forming compound image data into a plurality of blocks;

obtaining classifying data that designate one from a plurality of classes for each of a plurality of said blocks, based on predominate compression properties of the block;

for each of a plurality of said blocks, obtaining transformed data therefor from either a lossy or a lossless transform selected based on the classifying data for the block; and forwarding that transformed data to one entropy encoder, wherein the lossy transform is a DCT, and wherein said obtaining classifying data step comprises classifying the blocks based on the parameters of the number of adjacent pixels, C, in a scan line order whose values are different by an absolute difference greater than a predetermined number, the difference D between the minimum and maximum values of pixels in the block being classified, and at least one threshold value T1.

2. The method as defined in claim 1, wherein the forming compound image data step comprises forming blocks which are compatible with a JPEG standard.

3. The method as defined in claim 1, wherein the obtaining classifying data step comprises obtaining classifying data based on information in page description language associated with that block.

4. The method as defined in claim 1, wherein there are at least two threshold values, T1 and T2, and if C is greater than T1, then data from the DCT is used as the transformed data, if C is less than or equal to T1 and D is less than or equal to T2, then data from the DCT is used as the transformed data, and if C is less than or equal to T1 and D is greater than T2, then the data from the lossless transform is used as the transformed data.

5. The method as defined in claim 1, wherein the obtaining transformed data step comprises sending the block data through only the lossless transform or the lossy transform based on the classifying data.

6. The method as defined in claim 1, wherein the obtaining transformed data step comprises sending the block data through both the lossless transform and the lossy transform and then selecting the data from one of these transforms as the transformed data based on the classifying data.

7. The method as defined in claim 1, wherein an extra symbol is added to an entropy table for the entropy encoder for signaling a change among lossy transform and the lossless transform.

8. The method as defined in claim 1, wherein a first block in an image is a DCT block.

9. A method for compressing a compound image, comprising the steps of:

forming compound image data into a plurality of blocks;

obtaining classifying data that designate one from a plurality of classes for each of a plurality of said blocks, based on predominate compression properties of the block;

for each of a plurality of said blocks, obtaining transformed data therefor from either a lossy or a lossless transform selected based on the classifying data for the block; and forwarding that transformed data to one entropy encoder, wherein said forwarding to an entropy encoder step comprises coding a difference between a previous block and a current block as follows: for a previous block being a DCT block and a current block being a DCT, the difference between the DC value for the current block and the DC value for the previous block is coded; for a previous block being an LT block and the current block being a DCT, the difference between the DC value of the current DCT block and the y(0) value of the previous LT block that is coded; for a previous block that is a DCT block and the current block being an LT, the difference between the y(0) value and the DC value of the previous block is coded; and for a previous block that is an LT block and a current block that is LT, the difference between the y(0) value for the current block and the y(0) for the previous block is coded.

10. A method for compressing a compound image, comprising the steps of:

forming compound image data into a plurality of blocks;

obtaining classifying data that designate one from a plurality of classes for each of a plurality of said blocks, based on predominate compression properties of the block;

for each of a plurality of said blocks, obtaining transformed data therefor from either a lossy or a lossless transform selected based on the classifying data for the block; and forwarding that transformed data to one entropy encoder, wherein said obtaining transformed data step comprises obtaining transformed data from at least one of a lossy transform, a first lossless transform, or a second lossless transform, based on the classifying data for the transform, and wherein said obtaining classifying data step comprises classifying the blocks based on the parameters of the number of adjacent pixels, C, in a scan line order whose values are different by an absolute difference that is greater than at least one of: a first threshold value T1, a second threshold value T2, the difference D between the minimum and maximum values of pixels in the block being classified, and the number N of colors in a block.

11. The method as defined in claim 10, if N is less than or equal to two, then use data from the second lossless transform as the transformed data, else if D is greater than T2 and C is less than or equal to T1, then use data from the first lossless transform as the transformed data, else use the data from the DCT as the transformed data.

12. The method as defined in claim 10, wherein two extra symbols are added to an entropy table for the entropy encoder to signal a change among the lossy transform, the first lossless transform and the second lossless transform blocks.

13. The method as defined in claim 10, further comprising the entropy encoder selecting for use in encoding, one from a plurality of different Huffman tables, based on whether the block is a lossy block or a lossless block.

14. The method as defined in claim 10, wherein said obtaining classifying data step comprises classifying the blocks based on the parameters of the number of adjacent pixels, C, in a scan line order whose values are different by an absolute difference that is greater than all of the first threshold value T1, the second threshold value T2, the difference D between the minimum and maximum values of pixels in the block being classified, and the number N of colors in a block.

15. A method for compressing a compound image, comprising the steps of:

forming compound image data into a plurality of blocks;

obtaining classifying data that designate one from a plurality of classes for each of a plurality of said blocks, based on predominate compression properties of the block;

for each of a plurality of said blocks, obtaining transformed data therefor from either a lossy or a lossless transform selected based on the classifying data for the block; and forwarding that transformed data to one entropy encoder, wherein said obtaining transformed data step comprises obtaining transformed data from at least one of a lossy transform, a first lossless transform, or a second lossless transform, based on the classifying data for the transform, and wherein for the second lossless transform, the intensity values of the pixels for the blocks are assigned only two levels, V0 and V1, which are then mapped with pixels with intensity value V0 mapped to zero and pixels with value V1 mapped to 1, and then applying a bit-wise XOR operation to the pixels, and performing "bit packing" to represent each resultant quantity y(i) with just one bit.

* * * * *